United States Patent Office 2,930,785
Patented Mar. 29, 1960

2,930,785

PROCESS AND CATALYST FOR PRODUCTION OF OLEFIN POLYMERS

James T. Edmonds, Jr., Bartlesville, Okla., assignor to Phillips Petroleum Company, a corporation of Delaware No Drawing. Application April 5, 1956
Serial No. 576,242

14 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One type of catalyst which has been used in the polymerization of monoolefins, particularly ethylene, consists of organometal compounds, for example triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 1000, since a polymer of this molecular weight is a wax-like material.

It is an object of this invention, therefore, to provide an improved process for the production of high molecular weight olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising (1) a derivative of a metal of group IVA of the periodic table corresponding to the formula $M(OR)_m$, wherein M is a metal selected from the group consisting of titanium, zirconium, hafnium, and thorium, wherein R is a member selected from the group consisting of alkyl, aryl, cycloalkyl, alkaryl, aralkyl, alkenyl, cycloalkenyl, and acyl radicals and other combinations of these radicals, and wherein $m$ is an integer equal to the valence of the metal M, (2) a halide selected from the group consisting of halides of silicon, germanium, tin, lead, phosphorus, arsenic, antimony, and bismuth, and (3) an elemental metal having a higher oxidation potential than said selected metal M and selected from the group consisting of lithium, cesium, rubidium, potassium, barium, strontium, calcium, sodium, lanthanum, magnesium, thorium, beryllium, hafnium, aluminum, zirconium, and manganese. The improvement obtained when polymerizing an olefin in the presence of my novel catalyst is, firstly, that polymers of much higher molecular weight possessing very high impact strength and other desirable characteristics can be obtained than is true when certain of the prior art catalysts have been employed. Secondly, the polymerization reaction, particularly for ethylene, can be initiated and carried out at considerably lower temperatures and pressures than are necessary when employing the catalysts and processes of the prior art.

The group IVA metal derivative which is used in my catalyst system includes compounds corresponding to the formula $M(OR)_m$, wherein M, R, and $m$ are defined hereinabove. Each R contains not more than 20 carbon atoms, preferably less than 10 carbon atoms, with the total number of carbon atoms in the compound not exceeding 50. Examples of compounds corresponding to the formula $M(OR)_m$ include titanium butoxide (tetra-n-butyl titanate), tetra-sec-butyl titanate, tetraisopropyl titanate, tetra-2-ethylbutyl titanate, tetra-m-tolyl titanate, tetraallyl titanate, tetracyclohexenyl titanate, tetraethyl zirconate, tetraamyl zirconate, tetramethyl hafnate, tetraphenyl thorate, titanium acetate, zirconium butoxide, zirconium propionate, thorium benzoate, hafnium phthalate, and the like. Mixtures of two or more of the aforementioned compounds can be used in the catalyst composition of this invention.

The halide component of my catalyst system comprises the halides of the metals silicon, germanium, tin, lead, phosphorus, arsenic, antimony, and bismuth. Any of the chlorides, bromides, fluorides, and iodides of the aforementioned metals can be used in my catalyst system. Furthermore, it is within the scope of the invention to employ mixtures of two or more of the metal halides in the practice of my invention.

The elemental metals utilized as a component of my catalyst system are those which have a higher oxidation potential than the metal M in the compounds corresponding to the formula $M(OR)_m$, as defined hereinabove. The metals which are applicable are those selected from the group consisting of lithium, cesium, rubidium, potassium, barium, strontium, calcium, sodium, lanthanum, magnesium, thorium, beryllium, hafnium, aluminum, zirconium, and manganese. In the following table, the elemental metals listed after each group IVA metal have a higher oxidation potential than that particular group IVA metal.

Thorium—Li, Cs, Rb, K, Ba, Sr, Ca, Na, La, Mg
Hafnium—Same as for thorium plus Th and Be
Zirconium—Same as for hafnium plus Hf and Al
Titanium—Same as for zirconium plus Zr and Mn The table on page 286 of "Inorganic Chemistry" (1952) by Therald Moeller can also be referred to for the oxidation potential of the metals.

Among the catalyst compositions falling within the scope of this disclosure which are preferred because their use to catalyze the polymerization of olefins provides relatively high molecular weight polymers and/or permits the use of relatively low reaction temperatures and pressures are the following: a mixture of titanium butoxide, silicon tetrachloride and sodium; a mixture of titanium butoxide, silicon tetrachloride and magnesium; a mixture of titanium butoxide, antimony pentachloride and sodium; a mixture of zirconium butoxide, silicon tetrachloride and sodium; and a mixture of titanium butoxide, antimony pentachloride and magnesium.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of elemental halide to

M(OR)$_m$ compound will generally be in the range of 0.02 to 50, preferably 0.1 to 5, mols of halide per mol of M(OR)$_m$ compound. The ratio of the amounts of elemental metal to M(OR)$_m$ compound will usually be in the range of 0.02 to 50, preferably 0.1 to 5 mols of organic halide per mol of metal halide.

The materials which are polymerized in accordance with this invention can be defined broadly as polymerizable hydrocarbons. Preferably, the polymerizable hydrocarbons are olefins containing a CH$_2$=C< radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the process of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl substituted and 1,2-dialkyl-substituted ethylenes can be used, such as butene-2, pentene-2, hexene-2, heptene-3, 2-methylbutene-1, 2-methylhexene-1, 2-ethylheptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention. This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more other compounds containing an active CH$_2$=< group which are copolymerizable therewith. Examples of such compounds are listed hereinabove. Examples of other compounds containing an active CH$_2$=< group include styrene, acrylonitrile, methyl acrylate, methyl methacrylate, vinyl chloride, 2-methyl-5-vinylpyridine, 2-vinylpyridine, and the like.

One of the important advantages obtained in the polymerization of olefins in the presence of my novel catalyst is that lower temperatures and pressures can be used than in certain of the prior art processes. The temperature can be varied over a rather broad range, however, such as from zero and below to 500° F. and above. The preferred temperature range is from 100 to 350° F. Although pressures ranging from atmospheric and below up to 30,000 p.s.i.g. or higher can be employed, a pressure in the range of 100 to 1000 p.s.i.g. is usually preferred.

In this connection, it is noted that it is preferred to carry out the reaction in the presence of an inert, organic diluent, preferably a hydrocarbon, with a pressure sufficient to maintain the diluent in the liquid phase, giving rise to a so-called "mixed-phase" system. However, the polymerization process of this invention proceeds in the gaseous or liquid phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, nondeleterious and liquid under the conditions of the process. The lower molecular weight alkanes, such as propane, butane, and pentane, are particularly useful when carrying out the process at low temperatures. However, the higher molecular weight paraffins and cycloparaffins, such as isooctane, cyclohexane and methylcyclohexane and the aromatic diluents, such as benzene, toluene, and the like, can also be used, particularly when operating at higher temperatures. Halogenated hydrocarbons, such as halogenated aromatics, halogenated paraffins and halogenated cycloparaffins, are also useful as diluents. Mixtures of any two or more of the above-listed diluents can be employed as well in the process of this invention.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely also, such as up to 24 hours or more.

It has been found that various materials in some instances may have a tendency to inactivate the catalyst compositions of this invention. These materials include carbon dioxide, oxygen and water. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material should generally be freed of contaminants, such as water, oxygen, and the like. It is desirable, also, that air and moisture be removed from the reaction vessel before the reaction is carried out. However, in some cases, small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the solid polymer swollen with diluent, are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation or absorption, after which the polymer is dried. The diluent and treating agents can be separated by any suitable means, e.g., by fractional distillation, and reused in the process.

A more comprehensive understanding of the invention may be obtained by referring to the following illustrative example which is not intended, however, to be unduly limitative.

EXAMPLE I

Ethylene was polymerized in a 2700 cubic centimeter stainless steel rocking autoclave in the presence of a catalyst consisting of one gram of titanium butoxide [$Ti(OC_4H_9)_4$], one gram of silicon tetrachloride and one gram of sodium metal.

The autoclave was charged with 400 milliliters of cyclohexane (dried over sodium and distilled) prior to the addition of the catalyst components. The reactor was flushed with nitrogen prior to and during the charging procedure to prevent contact of the catalyst with air or moisture. The ethylene feed was passed through a purification system to remove oxygen, carbon dioxide and water vapor prior to entering the reactor. The purification system comprised an alkaline pyrogallol solution, a sodium hydroxide solution and drying agents.

Ethylene was added to the reactor containing the catalyst and cyclohexane until a pressure of 200 p.s.i.g. was reached. The reactor was then heated to maintain a temperature of 360° F. during the run, the time required for the run being 10 hours. At the end of the run, the temperature was noted to be 360° F. and the pressure was found to be 450 p.s.i.g. At this point, unreacted ethylene was bled from the reactor, and the vessel was cooled to room temperature with water. The reactor was then opened, and 200 milliliters of methyl alcohol was added to the reactor contents. Solid ethylene polymer was present in the reactor. The reactor contents were then stirred for 15 minutes in a Waring Blendor, after which this reactor effluent was filtered to remove the gray, solid polyethylene present. The solid polymer was then dried for 16 hours at 80° C. and at a pressure of less than 10 millimeters of mercury absolute. The weight of solid polymer recovered was 13 grams.

The physical properties of a compression molded sample of this ethylene polymer are presented below in the table:

Table

| | |
|---|---|
| Melting point, °F | 250±3. |
| Density, gms./cc. at room temperature | 0.990. |
| Melt index | Could not be determined, indicating a molecular weight of above 100,000. |
| Moldability | Fair. |
| Inherent viscosity | Insoluble in tetralin at 130° C.[1] |
| Color | Dark Brown. |

[1] Also indicates a molecular weight greater than 100,000.

The titanium butoxide used in this example was a colorless liquid with a melting point below −40° C. and was obtained from E. I. du Pont de Nemours and Company, Wilmington, Delaware. The ethylene was obtained from the Matheson Company, Inc., of Joliet, Illinois, and had a purity of 99.5 weight percent.

EXAMPLE II

A run was made in which it was attempted to polymerize ethylene to solid polymer utilizing a catalyst consisting of titanium butoxide and sodium.

Four hundred milliliters of cyclohexane (dried over sodium and distilled), 1 gram of titanium butoxide, and 1 gram of sodium were charged to a pressure reactor. The reactor was flushed with nitrogen prior to and during the charging procedure. After the addition of these materials, the reactor was pressured to 200 p.s.i.g. with ethylene, which had been passed through a purification system and described in Example I. The electric heater with which the reactor was provided was turned on. Immediately after the charging of the ethylene, the temperature was found to be 90° F. After 65 minutes, the temperature was 220° F., and the pressure was 300 p.s.i.g. The pressure and temperature continued to rise as a result of the heat supplied by the electric heater until 6 hours after the start of the run, the temperature was 400° F., and the pressure was 600 p.s.i.g. The reactor was maintained at 400° F. for an additional 13 hours during which period the pressure was constant at 600 p.s.i.g. At the end of the run, the reactor was cooled and then opened. There was no evidence of solid polymer in the reactor.

The titanium butoxide and ethylene used in this example were obtained from the same sources as in Example I.

The polymers produced in accordance with this invention have utility in applications where solid plastics are used. They can be used to impregnate paper and fabrics, and they can be molded to form articles of any desired shape, such as bottles and other containers for liquids. Furthermore, they can be formed into pipe by extrusion.

It will be apparent to those skilled in the art that variations and modification of the invention can be made upon study of the foregoing disclosure. Such variations and modifications are believed to be clearly within the spirit and scope of the invention.

I claim:

1. A method for polymerizing an aliphatic 1-olefin having up to and including 8 carbon atoms per molecule which comprises contacting said olefin with a catalyst comprising (1) a derivative of a metal of group IV–A of the periodic table corresponding to the formula $M(OR)_m$, wherein M is a metal selected from the group consisting of titanium and zirconium, wherein R is an alkyl radical containing up to and including 20 carbon atoms, and wherein m is an integer equal to the valence of the metal M, (2) a halide selected from the group consisting of halides of silicon and antimony, and (3) an elemental metal having a higher oxidation potential than said selected metal M and selected from the group consisting of lithium, cesium, rubidium, potassium, barium, strontium, calcium, sodium, lanthanum, magnesium, thorium, baryllium, hafnium, aluminum, zirconium, and manganese, said catalyst containing from 0.02 to 50 mols of said halide per mol of said group IV–A metal derivative and from 0.02 to 50 mols of said elemental metal per mol of said group IV–A metal derivative.

2. A method for polymerizing ethylene which comprises contacting said ethylene with a catalyst consisting essentially of a mixture of titanium butoxide, silicon tetrachloride and sodium, said mixture containing from 0.02 to 50 mols of said silicon tetrachloride per mol of said titanium butoxide and from 0.02 to 50 mols of said sodium per mol of said titanium butoxide.

3. A method for polymerizing ethylene which comprises contacting said ethylene with a catalyst consisting essentially of a mixture of titanium butoxide, silicon tetrachloride and magnesium, said mixture containing from 0.02 to 50 mols of said silicon tetrachloride per mol of said titanium butoxide and from 0.02 to 50 mols of said magnesium per mol of said titanium butoxide.

4. A method for polymerizing ethylene which comprises contacting said ethylene with a catalyst consisting essentially of a mixture of titanium butoxide, antimony pentachloride and sodium, said mixture containing from 0.02 to 50 mols of said antimony pentachloride per mol of said titanium butoxide and from 0.02 to 50 mols of said sodium per mol of said titanium butoxide.

5. A method for polymerizing ethylene which comprises contacting said ethylene with a catalyst consisting essentially of a mixture of zirconium butoxide, silicon tetrachloride and sodium, said mixture containing from 0.02 to 50 mols of said silicon tetrachloride per mol of said zirconium butoxide and from 0.02 to 50 mols of said sodium per mol of said zirconium butoxide.

6. A method for polymerizing ethylene which comprises contacting said ethylene with a catalyst consisting essentially of a mixture of titanium butoxide, antimony pentachloride and magnesium, said mixture containing from 0.02 to 50 mols of said antimony pentachloride per mol of said titanium butoxide and from 0.02 to 50 mols of said magnesium per mol of said titanium butoxide.

7. A method for polymerizing an aliphatic 1-olefin having up to and including 8 carbon atoms per molecule which comprises contacting said olefin with a catalyst comprising (1) a derivative of a metal of group IV–A of the periodic table corresponding to the formula $M(OR)_m$, wherein M is a metal selected from the group consisting of titanium and zirconium, wherein R is an alkyl radical containing up to and including 20 carbon atoms, and wherein $m$ is an integer equal to the valence of the metal M, (2) a halide selected from the group consisting of halides of silicon and antimony, and (3) an elemental metal having a higher oxidation potential than said selected metal M and selected from the group consisting of lithium, cesium, rubidium, potassium, barium, strontium, calcium, sodium, lanthanum, magnesium, thorium, beryllium, hafnium, aluminum, zirconium, and manganese, said catalyst containing from 0.02 to 50 mols of said halide per mol of said group IV–A metal derivative and from 0.02 to 50 mols of said elemental metal per mol of said group IV–A metal derivative, said contacting occurring at a temperature in the range of zero to 500° F., in the presence of a hydrocarbon diluent, inert and liquid under conditions of the method, and at a pressure sufficient to maintain said diluent in liquid phase, and recovering the solid polymer so produced.

8. A method for polymerizing ethylene which comprises contacting said ethylene with a catalyst consisting essentially of a mixture of titanium butoxide, silicon tetrachloride and sodium, said catalyst containing from 0.01 to 5 mols of said silicon tetrachloride per mol of said titanium butoxide and from 0.1 to 5 mols of said sodium per mol of said titanium butoxide, in the presence of a hydrocarbon diluent, inert and liquid under conditions of the method, at a temperature in the range of 100 to 350° F., and at a pressure in the range of 100 to 1000 p.s.i.g.

9. A catalyst composition comprising (1) a derivative of a metal of group IV–A of the periodic table corresponding to the formula $M(OR)_m$, wherein M is a metal selected from the group consisting of titanium and zirconium, wherein R is an alkyl radical containing up to and including 20 carbon atoms, and wherein $m$ is an integer equal to the valence of the metal M, (2) a halide selected from the group consisting of halides of silicon and antimony, and (3) an elemental metal having a higher oxidation potential than said selected metal M and selected from the group consisting of lithium, cesium, rubidium, potassium, barium, strontium, calcium, sodium, lanthanum, magnesium, thorium, beryllium, hafnium, aluminum, zirconium, and manganese, said catalyst containing from 0.02 to 50 mols of said halide per mol of said group IV–A metal derivative and from 0.02 to 50 mols of said elemental metal per mol of said group IV–A metal derivative.

10. A catalyst composition consisting essentially of a mixture of titanium butoxide, silicon tetrachloride and sodium, said mixture containing from 0.02 to 50 mols of said silicon tetrachloride per mol of said titanium butoxide and from 0.02 to 50 mols of said sodium per mol of said titanium butoxide.

11. A catalyst composition consisting essentially of a mixture of titanium butoxide, silicon tetrachloride and magnesium, said mixture containing from 0.02 to 50 mols of said silicon tetrachloride per mol of said titanium butoxide and from 0.02 to 50 mols of said magnesium per mol of said titanium butoxide.

12. A catalyst composition consisting essentially of a mixture of titanium butoxide, antimony pentachloride and sodium, said mixture containing from 0.02 to 50 mols of said antimony pentachloride per mol of said titanium butoxide and from 0.02 to 50 mols of said sodium per mol of said titanium butoxide.

13. A catalyst composition consisting essentially of a mixture of zirconium butoxide, silicon tetrachloride and sodium, said mixture containing from 0.02 to 50 mols of said silicon tetrachloride per mol of said zirconium butoxide and from 0.02 to 50 mols of said sodium per mol of said zirconium butoxide.

14. A catalyst composition consisting essentially of a mixture of titanium butoxide, antimony pentachloride and magnesium, said mixture containing from 0.02 to 50 mols of said antimony pentachloride per mol of said titanium butoxide and from 0.02 to 50 mols of said magnesium per mol of said titanium butoxide.

References Cited in the file of this patent

UNITED STATES PATENTS

| | | |
|---|---|---|
| 1,793,935 | Kaufler | Feb. 24, 1931 |
| 1,914,557 | Craver | June 20, 1933 |
| 2,406,869 | Upham | Sept. 3, 1946 |
| 2,728,755 | Weiseman | Dec. 27, 1955 |
| 2,765,297 | Heiligmann | Oct. 2, 1956 |
| 2,832,759 | Nowlin | Apr. 29, 1958 |
| 2,846,427 | Findlay | Aug. 5, 1958 |

FOREIGN PATENTS

| | | |
|---|---|---|
| 534,792 | Belgium | Jan. 31, 1955 |
| 874,215 | Germany | Apr. 20, 1953 |
| 716,159 | France | Dec. 16, 1931 |

UNITED STATES PATENT OFFICE

CERTIFICATE OF CORRECTION

Patent No. 2,930,785                      March 29, 1960

James T. Edmonds, Jr.

It is hereby certified that error appears in the printed specification of the above numbered patent requiring correction and that the said Letters Patent should read as corrected below.

Column 6, line 32, for "wherein H" read -- wherein R --; line 41, for "baryllium" read -- beryllium --.

Signed and sealed this 11th day of October 1960.

(SEAL)
Attest:

KARL H. AXLINE
Attesting Officer

ROBERT C. WATSON
Commissioner of Patents